United States Patent
Shaw (10) Patent No.: US 6,326,975 B1
(45) Date of Patent: *Dec. 4, 2001

(54) PRIORITY METHODS FOR TEXTURE MAP STORAGE

(75) Inventor: Christopher William Shaw, Austin, TX (US)

(73) Assignee: Cirrus Logic, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/102,612

(22) Filed: Jun. 22, 1998

Related U.S. Application Data (62) Division of application No. 08/670,299, filed on Jun. 27, 1996.

(51) Int. Cl.[7] .................................................... G06T 11/40
(52) U.S. Cl. ......................... 345/582; 345/552; 345/587; 711/118; 711/171
(58) Field of Search ................................. 345/430, 552, 345/543, 544, 557; 711/118, 151, 171

(56) References Cited

U.S. PATENT DOCUMENTS

| 5,056,044 | * | 10/1991 | Frederickson et al. | 364/521 |
| 5,680,363 | * | 10/1997 | Dosaka et al. | 365/230.03 |
| 5,742,797 | * | 4/1998 | Celi, Jr. et al. | 395/507 |
| 5,790,130 | * | 8/1998 | Gannett | 345/430 |
| 5,859,646 | | 1/1999 | Takenaka | 345/433 |
| 6,141,725 | * | 10/2000 | Tucker et al. | 711/100 |

FOREIGN PATENT DOCUMENTS

| 01053614 | 9/1990 | (JP) | G09F/15/72 |

* cited by examiner

Primary Examiner—Mark Zimmerman
Assistant Examiner—Mano Padmanabhan
(74) Attorney, Agent, or Firm—Steven Lin (57) ABSTRACT

A process and implementing computer system for graphics applications in which information files such as texture maps (TMs) are prioritized and stored in a local relatively fast RDRAM memory. The method of prioritization includes initially sorting the information files by order of the frequency with which corresponding graphics primitive elements are called by the application. The priority is adjusted such that the smaller TMs get an increase in their priority so that more TMs may be placed in faster graphics memory. Thereafter among similarly prioritized groups of information files, the larger of the files are first stored in the fast graphics memory and the remaining files are marked for storage in the system memory after the fast local memory has been fully utilized. A searching routine enables an identification of available or free storage space in the local memory and the method further compares individual texture map files with available free memory space to optimize storage of the texture maps on a priority basis to the fast local graphics memory.

6 Claims, 7 Drawing Sheets

PRIORITY METHODS FOR TEXTURE MAP STORAGE

This is a Division of Application No. 08/670,299, filed Jun. 27, 1996.

FIELD OF THE INVENTION

The present invention relates generally to computer graphics and more particularly to information storage and processing methods for graphics systems with optimized memory mapping.

BACKGROUND OF THE INVENTION

The use and application of computer graphics to an increasing number of systems environments continues to grow. This growth has been accelerated to an even greater extent with the availability of faster and faster information processing, storage, memory and retrieval devices. The speed of operation of such devices remains a high priority design objective. This is especially true in a graphics system and even to a greater extent with 3D graphics systems. Such graphics systems require a great deal of processing for huge amounts of data and the speed of data flow is critical in providing a new product or system or in designing graphics systems to apply to new uses.

In the field of computer graphics, many methods exist to draw polygons into a pixel grid. Polygons are used as drawing primitives for many applications such as Graphical User Interfaces, Computer Aided Design and 3D Computer Animation. Most techniques for drawing polygons reduce the polygon to a series of scan lines that align to the edges of the polygon and to the pixel grid. When these methods are implemented in hardware, the pixel grid is generally accessed in a sequential method, i.e. for each XY pixel access, the pixel grid is updated based on the XY address. For a pixel grid that has a large set-up time per pixel update, this can become a time bottleneck for the entire system.

In all data and information processing systems, and especially in computer graphics systems, much time is consumed in accessing data blocks from a memory or storage location, then processing that information and sending the processed information to another location for subsequent retention, access, processing and/or display. As the speed of new processors continues to increase, access time for accessing and retrieving data from memory is becoming more and more of a bottleneck in terms of system speed.

Graphic systems must be capable of performing more sophisticated functions in less time in order to process greater amounts of graphical data required by modern software applications. There is a continuing need for improvements in software methods and hardware implementations to draw three-dimensional objects using full color, shading, texture mapping and transparency blending. The development of raster display systems has dramatically reduced the overall cost and increased the capabilities of graphic systems. In a raster display system, a set of horizontal or orthogonal scan lines, each comprising a row of pixels, forms an array or grid of pixels to represent the entire screen area. The screen is preferably a cathode ray tube (CRT) or liquid crystal display (LCD) or the like capable of scanning the entire pixel grid at a relatively high rate to reduce flicker as much as possible.

The pixel data is preferably stored in a frame buffer comprising dynamic random access memories (DRAMs), where each pixel is represented by one or more bits depending upon the desired resolution, color, brightness and other variables. Typical display systems can draw screens with multiple colors with a variety of screen resolutions, such as, but not limited to, 640×480, 800×600, 1024×768, 1280×1024, or other combinations depending upon the software drivers and the hardware used. A video controller scans and converts the pixel data in the frame buffer to the control signals required by the screen system to display the information on the screen. The video controller scans each of the pixels sequentially, from top to bottom and from left to right, and converts pixel data into intensity values for corresponding pixels on the screen. In a color graphics system using a CRT, three separate beams are controlled i.e. one beam each for each of the primary colors, where the intensity of each of the beams is determined by the pixel value corresponding to the respective colors. A similar system is used for LCD devices. Each pixel value may comprise, for example, 24 bits, i.e. one 8-bit byte for each of the primary colors red, green and blue, where the byte value determines the intensity of the respective color to be displayed.

A pixel grid in memory is a representation of two dimensional space in a linear accessed memory. Linear accessed memory has incrementing addresses for each location in memory i.e. a one dimensional space. A two dimensional space can be represented in one dimensional addressing by creating a pitch value to the "Y" parameter, i.e. for each increment in "Y", a number of pixel grid locations exist in "X". This allows a linear address to be calculated from a two dimensional XY pixel grid access. Most methods for drawing to a pixel grid use the above method to access a pixel grid. The XY mapping is fixed at the time the polygons are being drawn based on the current two dimensional pixel grid in memory. From that point on, the pixel grid, unless noted otherwise, will be assumed to be a fixed two dimensional representation of a pixel grid in linear addressed memory.

A polygon is represented as a set of points in the pixel grid that map to the intersection of the polygon to be drawn. The definition of most lines and polygons are continuous functions that can only be approximated by the pixel grid. Polygons in computer graphics are generally drawn by decomposing the definition of the polygon to a set of boundary conditions called vertex points that represent approximations of the end points of the polygon into a pixel grid. Those vertex points are then decomposed to a set of scan lines for each Y scanning in the X direction for each pixel in the X direction contained within the polygon.

With specific reference to computer graphics applications, representations of images are stored in pixel-oriented frame buffers or display memory which may be implemented as Rambus-based DRAM (RDRAM). The frame of reference for the video buffers is a zero point relative to a matrix of storage positions for storing pixel values and information related to the pixel characteristics which define an image to be displayed. That zero point storage position corresponds to a zero point pixel position on a display screen utilized to display the image comprised of the stored pixels. A string or row of data from the buffer corresponds to a row of pixels on the display screen. As an image is refreshed on a display screen, each line of data stored in the video memory is sequentially accessed from memory and transferred to the display device to fill-in corresponding sequential lines of pixels on the display. Each such access and transfer has a delay time associated therewith which has heretofore been relatively unalterable because of the inherent dependence of the storing process on the scanning process, i.e. the initiation of each line of storage begins with the left-most pixel of each display scan line regardless of the position in the scan line which contains the first bit of image definition.

Also, in storing and retrieving information, delay is introduced when data has to be stored in and retrieved from system memory rather than the relatively faster RDRAM memory of the graphics subsystem. The graphics subsystem includes a relatively fast local memory or RDRAM which is faster than the system memory. Processing inefficiencies occur when information blocks cannot be accommodated by the fast local memory and have to be transferred to the system memory. Subsequently, when access to that information is needed, the fast graphics system must wait on the slower access from the system memory before processing and displaying any information that had to be stored on the system memory. Moreover, even when some system storage is unavoidable due to the data overhead of graphics applications, in the past there has not been any attempt to prioritize the data by types in order to optimize storage and retrieval times for the fast RDRAM and the relatively slower system memories.

Thus there is a need for an improved graphics information storage method and apparatus for storing texture map information by various information characteristics such that the storage destination is determined according to predetermined characteristics of the texture map data in order to minimize data storage and retrieval times.

SUMMARY OF THE INVENTION

An improved graphics information storage and retrieval method and apparatus is provided which stores information and data files or maps on an access priority or size basis to a local fast memory prior to sending such files to system memory for storage and retrieval, such that data files which are called for more frequently are stored in local memory and further prioritized on a size basis such that among data files having similar high priority access frequency, smaller data files are stored first in local memory and larger files of the same priority are stored in system memory after free memory space in the local memory has been utilized.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
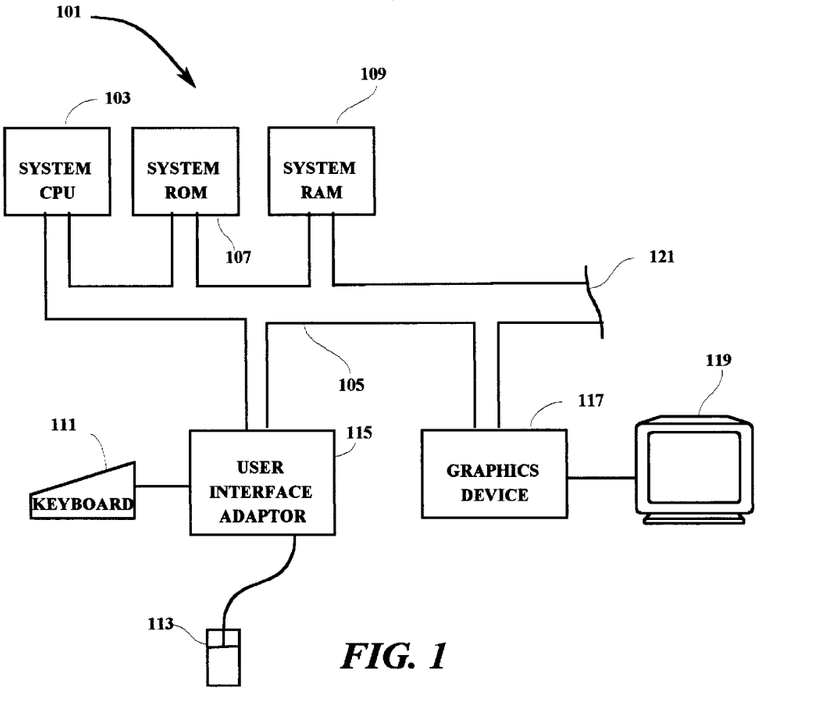
FIG. 1 is a block diagram of a computer system including a graphics system.

With reference to FIG. 1, the various methods discussed above may be implemented within a typical computer system or workstation 101, for example, which may include a graphics sub-system or device 117. A typical hardware configuration of a workstation which may be used in conjunction with the present invention is illustrated and includes a central processing unit (CPU) 103, such as a conventional microprocessor, and a number of other units interconnected through a system bus 105. The bus 105 may include an extension 121 for further connections to other workstations or networks, and the like. The workstation shown in FIG. 1 includes system random access memory (RAM) 109, and a system read only memory (ROM) 107. The system bus 105 is also typically connected through a user interface adapter 115 to a keyboard device 111 and a mouse or other pointing device 113. Other user interface devices such as a touch screen device (not shown) may also be coupled to the system bus 105 through the user interface adapter 115. The graphics device 117 is also shown connected between the system bus 105 and a monitor or display device 119. Since the workstation or computer system 101 within which the present invention is implemented is, for the most part, generally known in the art and composed of electronic components and circuits which are also generally known to those skilled in the art, circuit details beyond those shown in FIG. 1, will not be explained to any greater extent than that considered necessary as illustrated above, for the understanding and appreciation of the underlying concepts of the present invention and in order not to obfuscate or distract from the teachings of the present invention.

Figure 2:
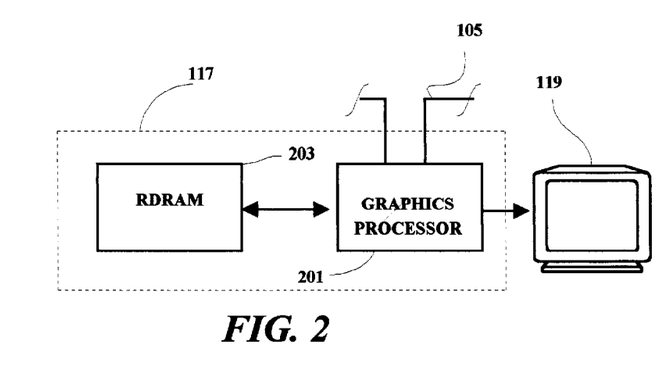
FIG. 2 is block diagram of the graphics device shown in FIG. 1.

In FIG. 2, the system bus 105 is shown connected to the graphics device or subsystem 117. The graphics device 117 may include, for example, a graphics processor 201 which is arranged to process, transmit and receive information or data from a relatively fast local frame buffer unit which in the present example is a RDRAM memory 203. The frame buffer unit or RDRAM 203 contains frame display information which is accessed by the graphics processor 201 which, in turn, is connected to a display device 119. The display device 119 is operable to provide a graphics display of the information stored in the frame buffer 203 as processed by the operation of the graphics processor 201. Although the present example shows a graphics processor 201 separate from a system CPU 103, it is understood that the present invention is not limited to having a separate graphics processor but rather also includes systems in which the methodology taught herein is implemented within or as part of a single system CPU or other larger system chip or integrated circuit.

Figure 3:
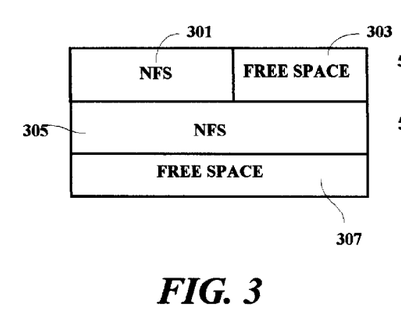
FIG. 3 is a memory map illustrating a typical memory configuration.

In FIG. 3, a memory map of a RDRAM memory includes two Non-Free Space (NFS) areas 301 and 305 which may be occupied by video buffer memory and "Z" Buffer memory for example. The memory map also includes two Free Space (FS) areas 303 and 307 which are unused open memory areas at a given point in time. The term "texture map" or "TM" is used herein to designate a block or chunk of memory spaces which contains bytes of information related to various graphics primitives or basic drawing elements which may be presented upon a certain pixel area on a display screen. The TMs, for example, may contain transparency or shading information about a triangularly shaped primitive drawing element of a known size. The texture maps will be of varying and predetermined configurations, i.e. memory area sizes and shapes, and such TMs or blocks of information need to be stored and accessed or called when the primitive with which the TM is associated, is called for processing by the graphics program. This drawing process by which primitives and their associated TMs are called for display, may occur continually during the graphics processing function and accordingly there are many access and storage functions occurring at a rapid pace. If the local graphics RDRAM memory is fully utilized, additional TMs are sent to the Host or System memory for storage and retrieval. In accordance with the present invention, the TMs are characterized by call frequency of their related primitive and also by TM size. The system may prioritize storage of the TMs in any manner to best suit the system to which the present storage and retrieval method is applied. In the present example, the TMs are characterized first by call frequency and then by size. Those TMs that apply to primitives that are most frequently used by a program have first priority and are stored first in RDRAM. Thereafter, TMs are stored in RDRAM on a size basis so that, among the TMs with substantially the same call frequency priority, larger TMs, which will require more accesses for a complete file transfer, will be first stored in the RDRAM and when the RDRAM is full, the remaining TMs will be sent to the Host or System memory for storage. In that manner, the most frequently used TMs will be provided with the least amount of access time and also the largest sized blocks or TMs, i.e. those with largest amounts of resolution or bytes-per-pixel (BPP) information, which may require multiple accesses, will also be stored in, and accessed from, fast RDRAM memory on a space available priority basis. In some cases, a weighting factor is used to increase the priority for small TMs. If, for example, the same area in fast memory may be taken by twelve texture maps having a first relatively lower priority of "1", or by only one larger texture map having a second higher priority of "2", the best usage of the fast memory would be to store the twelve texture maps in fast memory even though they have a relatively lower priority. In that case the higher priority TM would be stored in relatively slower system memory. In that way, more accesses to memory are to fast RDRAM because more TMs are in RDRAM despite the lower priority of those TMs.

It is also noted that programs and applications will vary in the number of times that certain primitives are called or used. Accordingly, the number of uses of the TMs is tracked and when one of the TMs in Host memory for example begins to be used more frequently than a TM in the RDRAM memory, a re-shuffle or swap can occur to have the TMs change locations in order to keep the most frequently used TMs in the fastest memory available. Depending upon the application, the frequency with which the re-shuffling of memory locations can occur can also be varied. Moreover, the disclosed method also accommodates multiple priorities and allows for resolution of mixed priority-size TMs on a sub-system basis.

The underlying methodology as illustrated in the present example, accomplishes the optimal storage of texture maps or TMs, of different resolutions and BPP into RDRAM by attempting to fit the largest TM into the smallest single block of free RDRAM space (FS) so that if a larger texture needs to registered later, the larger texture will have a higher probability of fitting into the RDRAM. For example, the RDRAM configuration shown in FIG. 4 includes three non-free space (NFS) blocks 501, 503 and 505. In FIGS. 4–8, corresponding numerals refer to corresponding parts in all of the illustrations. NFS block 501 occupies the upper left-hand corner of the RDRAM and NFS 503 is of corresponding height and occupies the area directly to the right of NFS 501 with reference point "A" between NFS areas 501 and 503, and reference point "C" at the right side of the NFS block 503. NFS 505 begins directly below NFS 501 and has a corner vertex or reference point "B" defining its lower-most and right-most vertex. NFS areas 501–505 are occupied with information relating to other functions of a graphics system and are unavailable to accept TMs or additional blocks of information. There is, however, free space (FS) in the RDRAM as indicated in the lower right-hand corner 407. For purposes of the present example, it is assumed that there are many TMs of various sizes and call or use frequencies (the number of times a texture is used, i.e. not the number of times a texture is registered but rather the number of polys that use the texture or TM) which need to be stored for optimized access.

Figure 4:
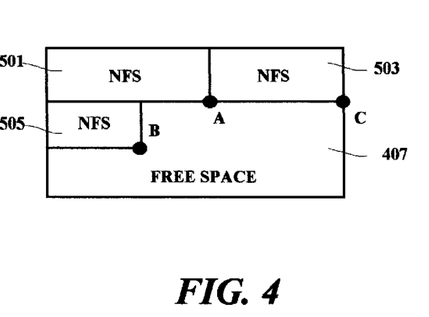
FIG. 4 is a memory map useful in explaining one aspect of the operation of the present example.
Figure 5:
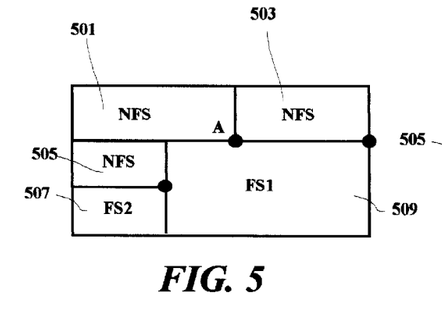
FIG. 5 is a memory map useful in explaining one aspect of the operation of the present example.
Figure 6:
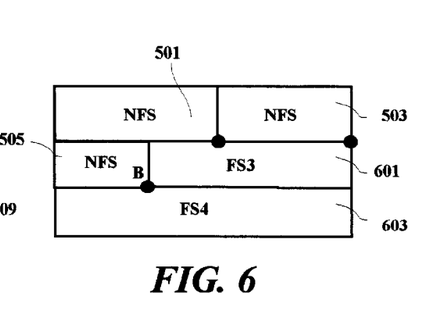
FIG. 6 is a memory map useful in explaining one aspect of the operation of the present example.
Figure 7:
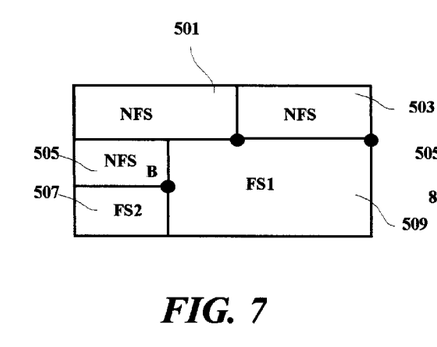
FIG. 7 is a memory map useful in explaining one aspect of the operation of the present example.
Figure 8:
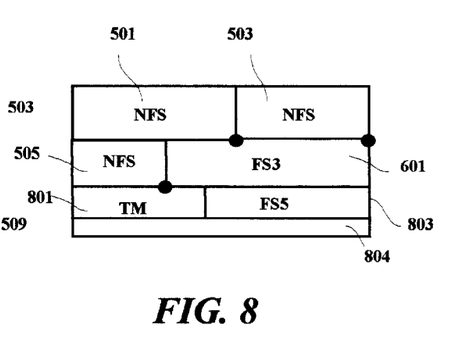
FIG. 8 is a memory map useful in explaining one aspect of the operation of the present example.

In FIG. 5, the FS 407 of FIG. 4 is divided to provide two areas of free space "FS2" 507 and "FS1" 509. In FIG. 6 The free space 407 is divided in a different manner to define free spaces FS3 601 and FS4 603. FIG. 8 illustrates the assignment of a TM within the area of FS4 603 and the reconfiguration of the RDRAM into NFS 801 (occupied by the assigned TM) and the remaining free space 803 and 804. FIG. 5 through FIG. 7 illustrate the operation of an exemplary routine for finding free space in a RDRAM while FIG. 8 is useful in explaining a "Put" routine for installing a TM to a free space and re-mapping the RDRAM. FIG. 5 through FIG. 8 will be referred to in connection with the flowcharts shown in FIG. 13 and FIG. 14.

Figure 9:
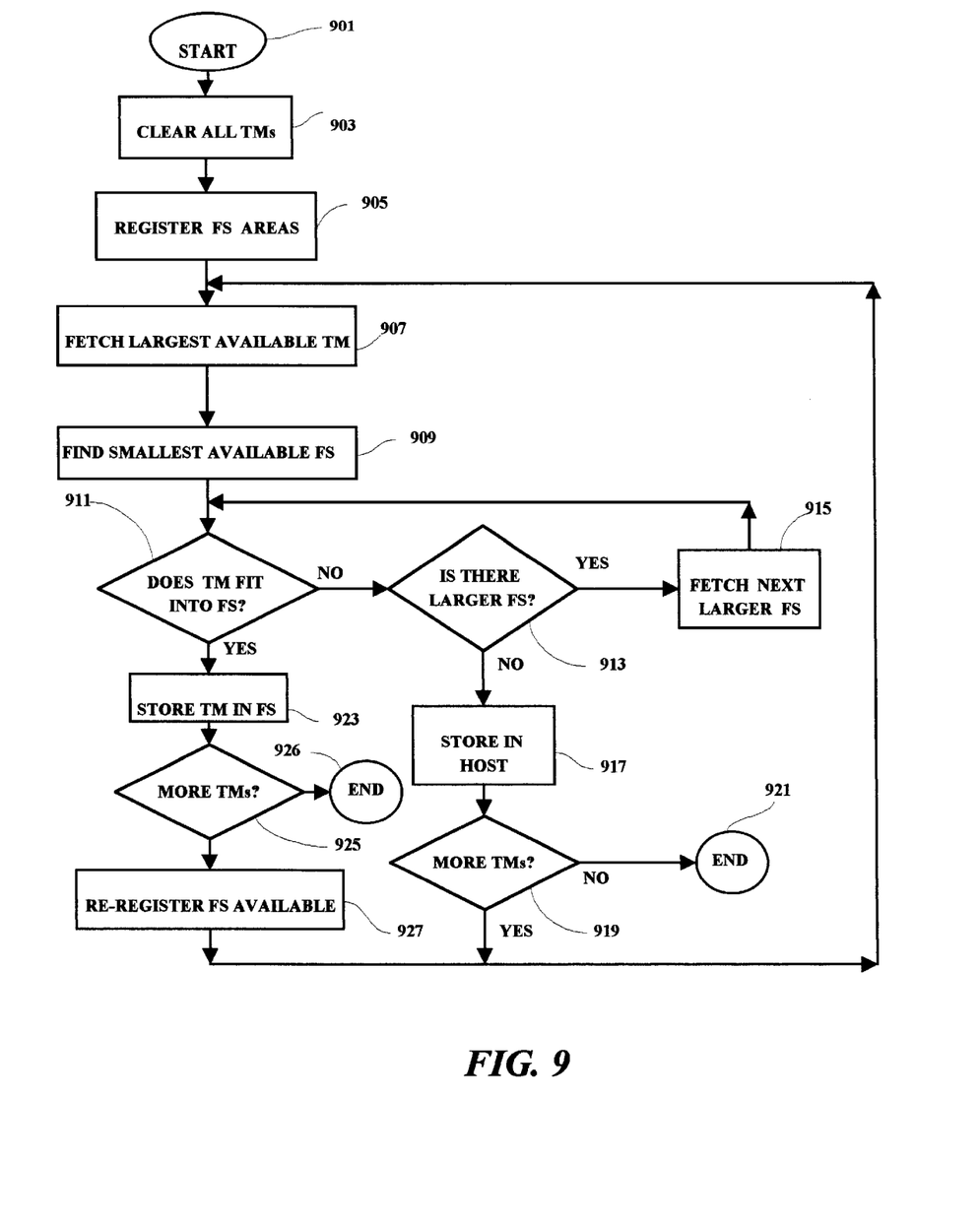
FIG. 9 is a flowchart illustrating a typical operation of the exemplary embodiment.

Referring now to FIG. 9, the overall method implemented in the optimal storing of TMs is illustrated. The program STARTs at block 901 by clearing all TMs from RDRAM memory at block 903. Thereafter, all of the FS areas in the RDRAM are registered at block 905. The next step will fetch at block 907 the largest available texture map TM to be stored. Thereafter, the program will find at block 909 the smallest available free space FS in the RDRAM. A determination is then made at block 911 as to whether or not the largest available TM fits into the smallest available free space FS. If the TM does not fit, a determination is then made as to whether or not there is a larger free space available at block 913 in the RDRAM. If a larger free space is available, the next larger free space is fetched at block 915 to determine if the TM will fit at block 911. That loop is repeated until a large enough free space is found, and the TM is stored at block 923. Otherwise, if a large enough free space is not found and there are no larger free spaces available at block 913 then the TM is sent to the Host or system memory for storage at block 917. At that point, a determination is made as to whether or not there are any more TMs at block 919. If not, the method will end at block 921. If there are more TMs for storage, the method repeats by fetching the largest of the available TMs at block 907. In each case, when a TM is stored in a free space at block 923, a determination is made as to whether or not there are more TMs at block 925. If there are no more TMs, the process will end at block 926. Otherwise, if there are more TMs, the method will re-register or re-order the free space available at block 927 after deducting the newly stored TM, and continue by fetching the largest of the available TMs at block 907.

Figure 10:
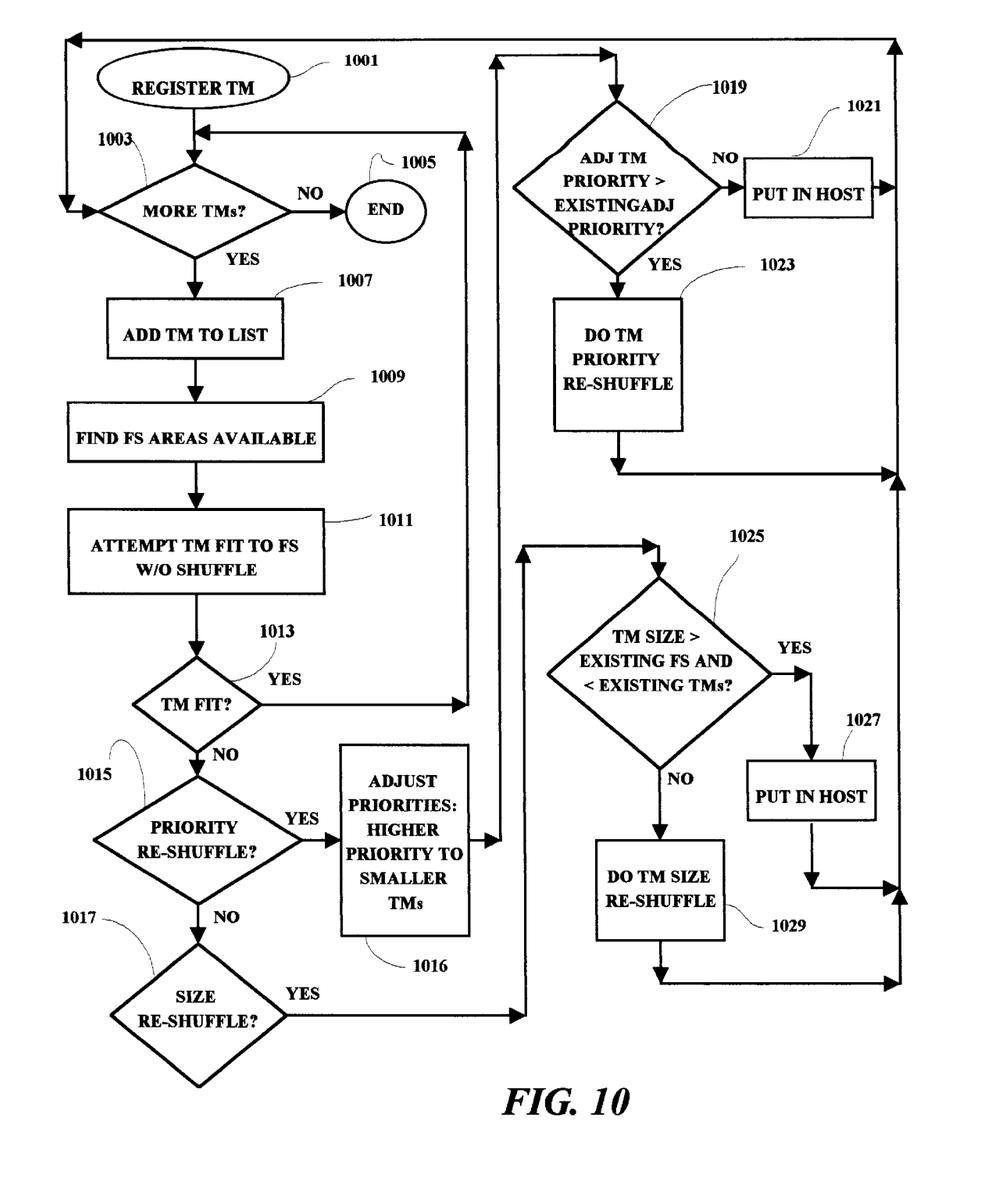
FIG. 10 is a flowchart illustrating one aspect of the present method.

In FIG. 10, the method of registering TMs is illustrated in more detail. The TM priority and size factors are also illustrated as they relate to the need and frequency of the re-shuffle or priority re-ordering process. The Register TM routine 1001 is called for example, when the fetch largest available TM at block 907 (FIG. 9) function is invoked. First a determination is made as to whether there are more TMs to be registered at block 1003. If not the process ends at block 1005. If there are more TMs, one TM is added to the list at block 1007. Next an available FS area is found at block 1009 and an attempt is made to fit the TM into the FS area at block 1011 without a re-shuffle of priorities or size. If the TM fits at block 1013, the TM remains on the TM list and the process returns to determine if there are any more TMs at block 1003. If, however, the TM does not fit, the method determines whether or not a priority re-shuffle at block 1015 is needed or programmed, i.e. if the TM one which is used more frequently than others. If a priority re-shuffle is not called for, then the method program determines whether or not a size re-shuffle is needed or programmed at block 1017, i.e. if the size of the TM is greater than a predetermined size and would require several accesses to transfer the entire TM. In the present example it is assumed that a size re-shuffle will be done at that point in the program in all cases although the method may provide other options if a size re-shuffle is not deemed appropriate at that point in the process. If either a priority re-shuffle or a size re-shuffle is called for, then the method continues to carry out the appropriate function.

For a priority re-shuffle, priorities are weighted for small TMs at block 1016, i.e. priorities are adjusted to give a higher priority to smaller TMs. A determination is then made as to whether or not the adjusted TM priority of the TM being processed is greater than the adjusted priorities of the TMs already existing in the RDRAM at block 1019. If not, the TM is put into the Host or system memory at block 1021 and a determination is made as to whether or not there are any more TMs to be registered at block 1003 and if so the process will add the next TM to the list at block 1007 and continue as hereinbefore explained. If, however, the TM being processed has a priority greater than the priorities of the TMs already existing in the RDRAM 203, then the TM priority is re-shuffled at block 1023 to include the TM being processed and drop out a previously stored TM with a lower priority.

If a size re-shuffle is called for, then a determination is made as to whether or not the TM size is greater than the sizes of existing free spaces and smaller than the existing and previously RDRAM stored TMs at block 1025. If the result is positive, the TM is put into the Host memory at block 1027 and the process returns to determine if there are more TMs at block 1003. If, however, the size of the TM being processed is not greater than the existing free spaces and not less than the previously RDRAM stored TMs, then a size re-shuffle is initiated at block 1029 and the TM being processed is put into the RDRAM replacing a previously stored smaller TM.

The priority re-shuffle method at block 1023 is illustrated in more detail in connection with FIG. 11. When the process begins at block 1101 priorities are assigned at block 1103 to the TMs and the TMs are sorted at block 1105 according to priorities. Next, attempts are made to fit different percentages of the top priority TMs into the available free space by size by using a fit-by-size reshuffle method at block 1107, until all the TMs within this top percentage fit, at which time the process ends at block 1109.

Figures 11, 12:
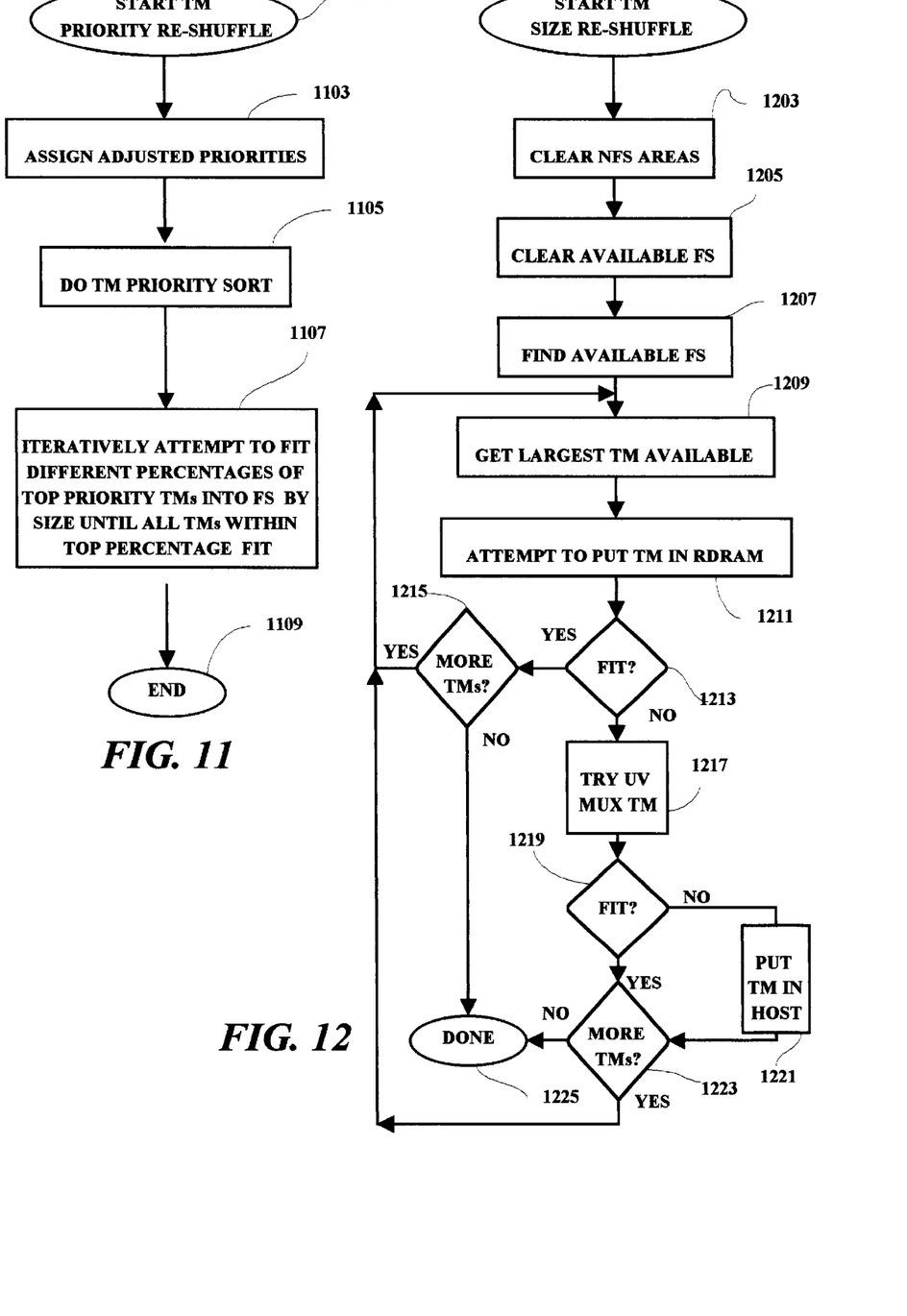
FIG. 11 is a flowchart showing a re-shuffle routine implemented in the present example.
FIG. 12 is a flowchart illustrating another re-shuffle routine used in the present example.

In FIG. 12, the size re-shuffle routine at block 1029 of FIG. 10 is shown in more detail. After the routine is initiated at block 1201, all of the non-free space NFS memory areas are cleared at block 1203. Next all of the available free space FS areas are cleared at block 1205, and the find available free space function is executed at block 1207. Next, the method gets the largest of the available TMs at block 1209 and attempts to put the TM into the RDRAM at block 1211. If there is a fit at block 1213, i.e. if the largest available TM fits into RDRAM without further action, then the program determines if there are more TMs at block 1215. If there are more TMs, then the program returns to get the largest TM available at block 1209, and that loop is continued until either there is no fit at block 1213 or there are no more TMs at block 1215. When there is a fit but there are no more TMs at block 1215, the routine ends at block 1225. When there is no fit at block 1213, the program will try to UV mux the TM at block 1217.

A UV mux is a method by which the dimensions of the TM are modified while preserving the total size of the TM. For example, a TM can be UV muxed by halving its height and doubling its width. In that way the TM has the same size and information but a different dimension and may fit more easily into free space that is available in RDRAM.

Next, if there is no fit at block 1219 of the TM into the RDRAM, the TM is sent to the Host memory. If there is a fit at block 1219 or if the TM is sent to the Host memory at block 1221, then the program checks for more TMs at block 1223 and loops back to get the largest TM available block at block 1209. The loop is terminated when there are no more TMs available at block 1223.

Figures 13, 14:
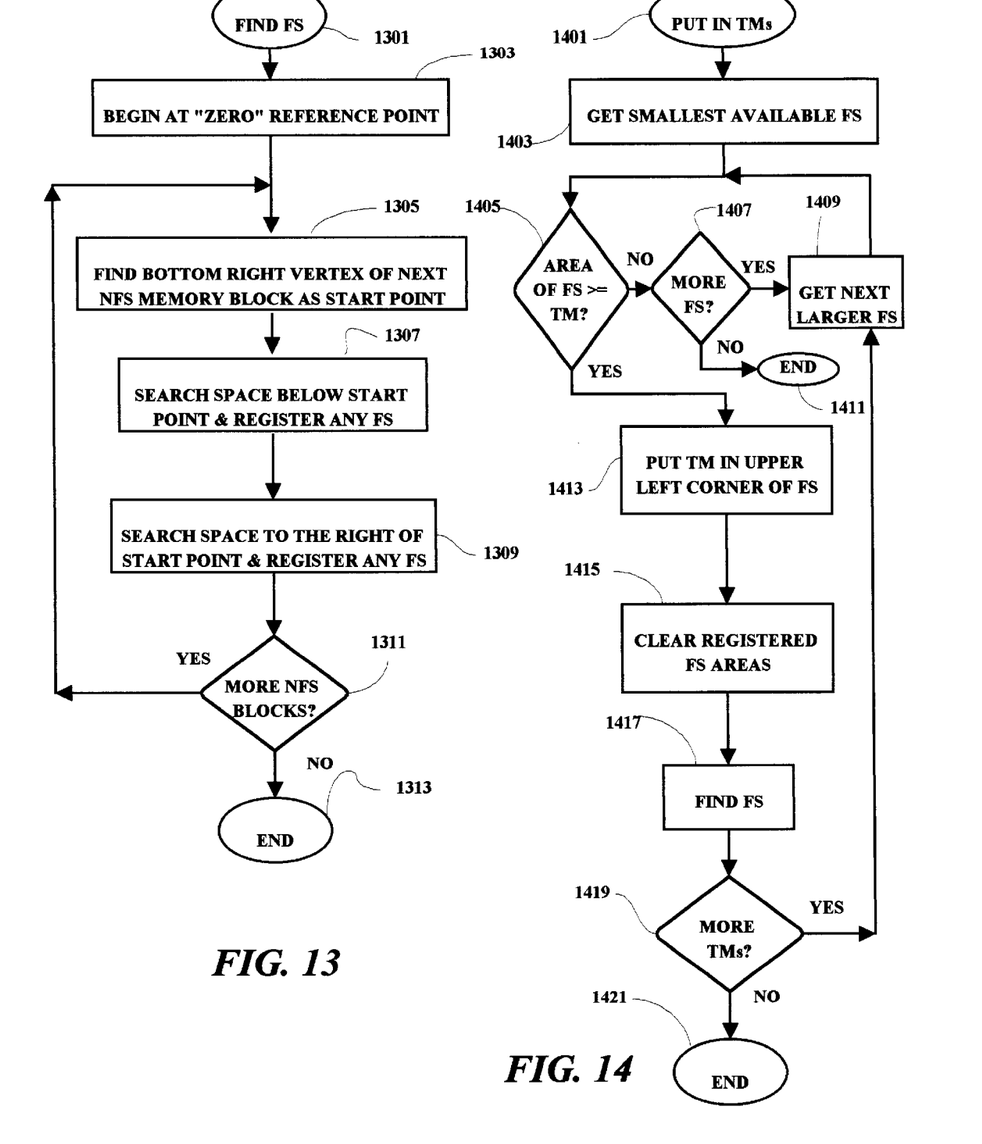
FIG. 13 is a flowchart illustrating a "Find" function implemented in the present example.
FIG. 14 is a flowchart illustrating a "Put" routine implemented in the disclosed example.

In FIG. 13, the find free space FS routine is shown in more detail. Reference is also made to FIG. 5 through FIG. 7. When the find FS routine is called at block 1301, the process begins at a designated "zero" reference point at block 1303. That point may vary depending upon the system and RDRAM limitations. In the present example, the bottom right vertex of the next NFS memory block is located as a start point at block 1305. This corresponds to point "A" in FIG. 5. Next, the space directly below the start point is examined and any free space FS is registered at block 1307. For example, FS1 in FIG. 5 would be registered. Next, the space to the right of the start point is checked and any FS there is also registered at block 1309. The program then determines if there are any more NFS blocks at block 1311 and if there are, the routine returns to find the bottom right vertex of the next NFS memory at block 1305. For example, in FIG. 6 the program would return to point "B". Next the program would locate the FS below "B" i.e. FS4, and then to the right of "B" i.e. FS3. FS3 and FS4 could also be broken down in the manner as shown in FIG. 7 with FS2 and FS1. The various possible sub-divisions of the free space will be tracked and referred to in the "fitting" tests performed during the routines. The method shown is one method of probing the free memory space and dividing the free space into free space segments, it being understood that there are other methods of accomplishing the noted function and all such methods are considered within the broader scope of the present invention. After each search from each corner of NFS in the RDRAM, a check is made as to whether or not there are more NFS blocks at block 1311. If there are more NFS blocks, the process returns to find the bottom right vertex (in the present example) as a start point at block 1305 for the next sub-division of the free space. When there are no more NFS blocks at block 1311 the routine ends at block 1313.

FIG. 14 illustrates the routine that puts the TMs into RDRAM. This is also schematically illustrated in FIG. 8. As the routine is initiated at block 1401, the smallest available free space FS is determined at block 1403. Next a test is made to determine whether the area of the free space is greater than or equal to the texture map or TM at block 1405. If the free space area passes that test, the TM is placed into the upper left corner of the free space at block 1413. Referring to FIGS. 6–8, FS4 is defined to be smaller than FS1 so that the TM 801 would be placed into the FS4 of FIG. 6 as shown in FIG. 8.

If the area of the FS is not greater than or equal to the TM at block 1405, then a check is made to determine if there is more free space at block 1407, and if there is, then the next larger free space area is referenced at block 1409 and the FS area loop at blocks 1405, 1407 is re-applied. The routine will end at block 1411 when no more FS areas are found at block 1407. After a TM is placed in a FS of the RDRAM at block 1413, the registered FS areas are cleared at block 1415 and the find free space function at block 1417 is effected. Thereafter, if there are more TMs at block 1419 the routine returns to get the next larger FS and loop through the FS area loop at blocks 1405, 1407. When there are no more TMs at block 1419, the routine ends at block 1421.

Figures 15, 16:
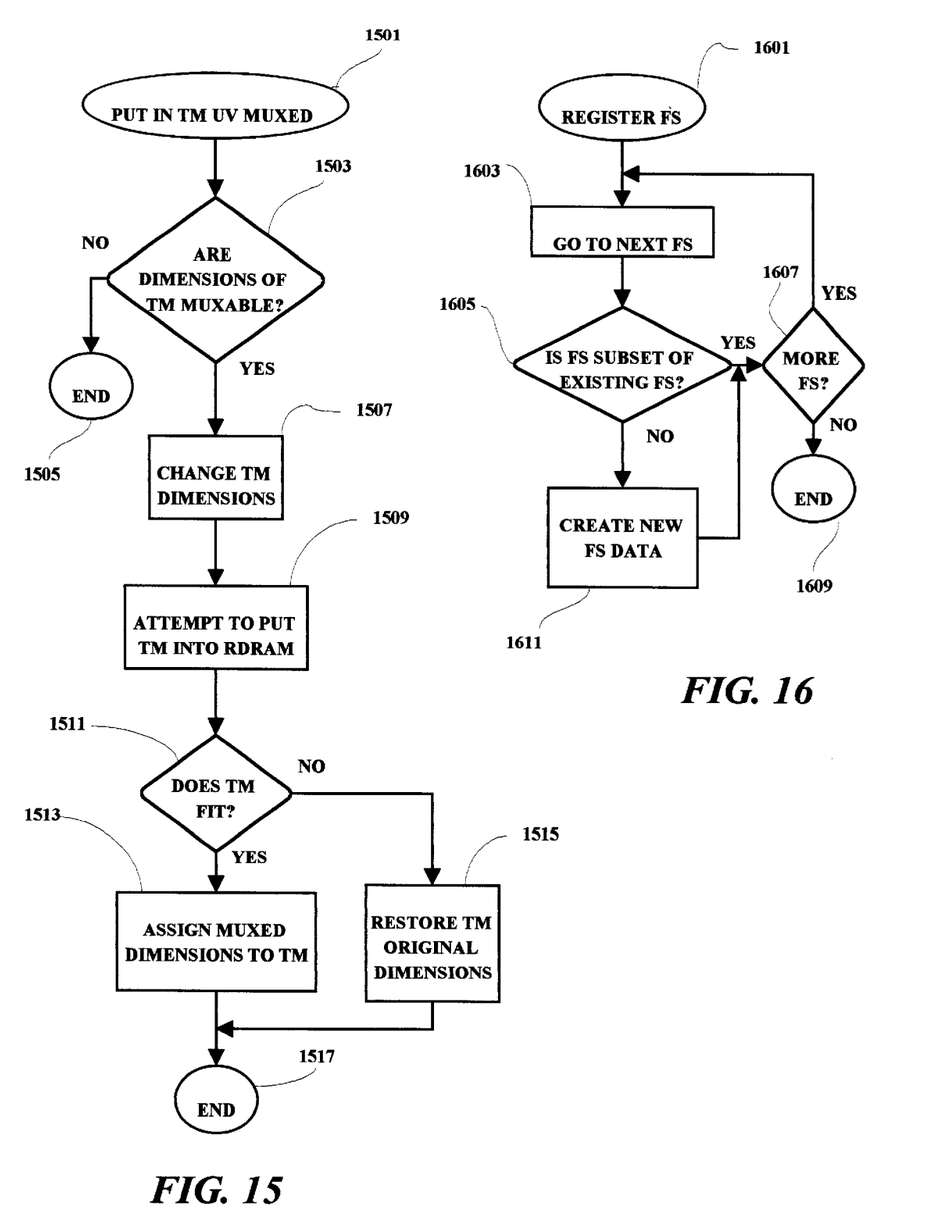
FIG. 15 is a flowchart showing a "muxed" routine implemented in the present example.
FIG. 16 is a flowchart showing a "Register" function implemented in the disclosed method.

The put in TM UV muxed process is shown in more detail in FIG. 15. When the routine is initiated at block 1501, a determination is made as to whether or not the dimensions of the TM are muxable at block 1503. If not, the routine will end at block 1505. If, however, the dimensions are muxable at block 1503 the dimensions of the TM are changed at block 1507 and an attempt is made to put the TM into the RDRAM at block 1509. If the TM does not fit at block 1511, then the original dimensions of the TM are restored at block 1515 and the routine ends. If the TM with the changed dimensions does fit into the RDRAM at block 1511, then the muxed dimensions are assigned to the TM 1513 and the routine ends.

FIG. 16 illustrates the register FS method. When the process begins at block 1601, the next FS is referenced at block 1603 and a determination is made as to whether or not the particular FS is a subset of existing designated FS areas at block 1605. If it is a subset then a determination is made if there are more FS areas at block 1607 and if there are, then the process loops back to get the next FS at block 1603. If the current FS is not a subset of existing FS at block 1605 then new FS data file is created at block 1611 and a check is made for more FS areas at block 1607. The routine ends at block 1609 when there are no more FS areas.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for storing a group of texture maps in a memory comprising at least first and second memory devices, said first memory device being faster than said second memory device, said method comprising:

marking each texture map according to at least a first predetermined characteristic of the information, said first characteristic of said information being indicative of a particular size of said texture map relative to sizes of other texture maps to be stored; and storing said texture maps in said first memory device in accordance with a weighted priority schedule based on at least sizes of said texture maps and numbers of said texture maps with similar sizes.

2. The method as set forth in claim 1 wherein said texture maps are also marked according to a second predetermined characteristic, wherein said second predetermined characteristic is related to a frequency over a predetermined period of time with which said texture map is retrieved from said memory; and wherein said texture maps are stored in said first memory device in accordance with a predetermined priority schedule for said first and second predetermined characteristics.

3. The method as set forth in claim 1 wherein said texture maps are also marked according to a second predetermined characteric, wherein said second predetermined characteristic is related to a frequency over a predetermined period of time with which said texture map is retrieved from said memory; and wherein said texture maps are stored in said first memory in accordance with a predetermined priority schedule for said first and second predetermined characteristics.

4. The method as set forth in claims 1 or 3 wherein said texture maps are individually sequenced by specific size of each of said texture maps relative to specific sizes of said other texture maps prior to said storing whereby larger ones of said texture maps are stored on a priority basis in said first memory device before smaller ones of said texture maps.

5. The method as set forth in claim 1, wherein the weighted priority schedule involves assigning a higher priority to storing in said first memory device a larger number of smaller ones of said texture maps over a smaller number of larger ones of said texture maps.

6. The method as set forth in claim 1, further comprising the steps of:

adjusting a total number of said texture maps based on additional texture maps;

changing said weighted priority schedule based on the sizes of said adjusted total number of said texture maps and the numbers of said adjusted total number of said texture maps with similar sizes; and re-storing said texture maps in said first memory device based on said changed weighted priority schedule.

* * * * *